US005221166A

United States Patent [19]

Bothum

[11] Patent Number: 5,221,166

[45] Date of Patent: Jun. 22, 1993

[54] SPADE-TYPE DRILL BIT APPARATUS AND METHOD

[75] Inventor: John D. Bothum, Albert Lea, Minn.

[73] Assignee: Enderes Tool Co., Inc., Apple Valley, Minn.

[21] Appl. No.: 739,600

[22] Filed: Jul. 31, 1991

[51] Int. Cl.[5] ............................................ B23B 51/00

[52] U.S. Cl. .................................. 408/212; 408/213; 408/228

[58] Field of Search ............... 408/211, 212, 213, 214, 408/225, 228; 76/102

[56] References Cited

U.S. PATENT DOCUMENTS

| | | | |
|---|---|---|---|
| 1,799,318 | 4/1931 | Rehback . | |
| 2,627,292 | 2/1953 | Kronwall | 408/213 |
| 2,692,627 | 10/1954 | Stearns . | |
| 2,794,468 | 6/1957 | Hustable . | |
| 2,812,791 | 11/1957 | Mackey . | |
| 3,121,351 | 2/1964 | Mount . | |
| 3,920,350 | 11/1975 | Southall . | |
| 3,997,279 | 12/1976 | Porter . | |
| 4,066,379 | 1/1978 | Prohaska . | |
| 4,286,904 | 9/1981 | Porter et al. . | |
| 4,527,449 | 7/1985 | Sydlowski et al. . | |
| 4,682,917 | 7/1987 | Williams, III et al. . | |

FOREIGN PATENT DOCUMENTS

| | | | |
|---|---|---|---|
| 2130935 | 6/1984 | United Kingdom | 408/214 |

OTHER PUBLICATIONS

Photos of drill bit No. 1 (labelled Exhibit A).
Photos of drill bit No. 2 (labelled Exhibit B).
Photos of drill bit No. 3 (labelled Exhibit C).
Photos of drill bit No. 4 (labelled Exhibit D).
Photos of drill bit No. 5 (labelled Exhibit E).

*Primary Examiner*—Daniel W. Howell
*Attorney, Agent, or Firm*—Merchant, Gould, Smith, Edell, Welter & Schmidt

[57] ABSTRACT

A spade-type drill bit is disclosed having a shank portion and a spade bit portion extending from the shank portion. The spade bit portion includes a spade portion with a planar region, and a center tip concentric with a longitudinal axis and extending from the spade portion. First and second radial cutting edges extend from the center tip toward first and second corner tips. First and second longitudinal cutting edges extend along longitudinal sides of the spade portion and terminate at the first and second corner tips. The first and second corner tips are located forward of the plane of the spade portion in the direction of rotation of the drill bit. The first and second radial cutting edges, and the first and second longitudinal cutting edges further include curved portions adjacent each of the first and second corner tips. Threads may also be provided on the center tip. A method of manufacturing is disclosed wherein each of the corner tips are formed by cutting from a smashed planar portion of a round rod an outline of the spade bit and further bending each of the corner tips in a direction of rotation of the spade bit.

8 Claims, 4 Drawing Sheets

SPADE-TYPE DRILL BIT APPARATUS AND METHOD

FIELD OF THE INVENTION

The present invention relates to spade-type drill bits and methods for manufacturing same.

BACKGROUND OF THE INVENTION

Spade-type drill bits, hereinafter referred to as "spade bits", are known in the art for drilling or boring holes through wood and other materials. Typically, the spade bit includes an elongated shank with a spade bit portion at one end of the shank for boring through the wood or other material. The opposite end of the shank is received and held by the drill during the drilling operation.

The spade bit portion of the spade bit generally includes a plate-like structure, sometimes planar, which is generally thinner than the shank. Sharpened cutting edges are provided that engage and cut the wood or other material during drilling. The spade bit portion also typically includes a centering tip.

Spade bits come in a variety of sizes for drilling holes anywhere from ¼ inches in diameter or smaller to 1 and ½ inches in diameter or larger. Spade bits are useful in drilling holes of different sizes and are used instead of conventional auger drill bits or twist drill bits. Prior problems with known spade bits are that they have a tendency to become dull quickly, do not cut well through desired materials even when sharp, and are difficult to manufacture and sharpen.

Several significant concerns exist both for drill bits generally, and also in particular, for spade bits. One significant concern is the performance characteristics of the spade bit. Considerations such as the speed of cutting holes and the ease of cutting holes are important. In some circumstances, the length of time for the spade bit to cut through the material is important. These considerations are also related to the power and torque requirements necessary to cut the hole. Power and torque requirements may impact whether the spade bit can be used with ordinary electric drills or conventional cordless drills.

Another consideration related to performance is the ability of the spade bit to be easily resharpened after the spade bit has been used for a period of time and becomes dull. Complex shapes for the cutting edges and surfaces may make it difficult or impossible for the spade bit to be sharpened without special equipment. Complex shapes may also make it too time consuming to resharpen, meaning that the blades would have to be disposed of once they became dull. The ability to produce even, smoothly cut holes is also desireable in a spade bit.

A further consideration with respect to the spade bits relates to the ability to manufacture the spade bits easily and inexpensively. Complex shapes or complex processes may excessively raise the costs to manufacture the bits.

There has existed a long and unfilled need in the prior art for a spade bit and method for manufacturing the same which addresses the above and other problems and concerns relating to spade bits.

SUMMARY OF THE INVENTION

According to the present invention, a spade-type drill bit is provided having a shank portion and a spade bit portion extending from the shank portion. The spade bit portion includes a spade portion with a planar region, and a center tip concentric with a longitudinal axis and extending from the spade portion. First and second radial cutting edges extend from the center tip toward first and second corner tips. First and second longitudinal cutting edges extend along longitudinal sides of the spade portion and terminate at the first and second corner tips.

The first and second corner tips extend forward of a plane defined by the planar region of the spade portion in the direction of rotation of the spade bit. The first and second radial cutting edges further include nonlinear, preferably curved, portions adjacent each of the first and second corner tips. The first and second longitudinal cutting edges include nonlinear, preferably curved, portions adjacent each of the first and second corner tips. The nonlinear cutting edges form wedges terminating at the corner tips and protruding from the planar region of the spade bit in the direction of rotation of the spade bit.

With the corner tips being disposed forward in the direction of rotation forming the protruding wedges, the present invention results in a spade bit which drills faster and more efficiently than conventional spade bits. Further, the radial cutting edges are preferably disposed in a single plane to facilitate easy resharpening should those edges become dull.

Preferably, bevelled side surfaces and bevelled bottom surfaces are provided on the edges of the spade bit portion. Also, the corner tips are located closer to the end of the center tip in the longitudinal direction than the intersection points of the radial cutting edges and the center tip. In other words, the radial cutting edges preferably extend partially downward in a direction toward the corner tips when the spade bit is oriented vertically with the center tip pointing downward. This forms a hole with a partially convex shape to the bottom as the hole is drilled.

Material engaging threads may also be provided on the center tip to assist the spade bit in drilling. The threads provide mechanical assistance to draw the spade bit through the wood or other material to be drilled through.

The present invention also relates to a method of manufacturing a spade bit from an elongated piece of round stock. The spade portion of the spade bit is formed by smashing a portion of the stock into a planar shape. The particular shape of the spade portion including each of the corner tips and the center tip is cut or stamped from the smashed planar portion in an outline of the spade bit. The corner tips are formed or bent in a direction of rotation of the spade bit to form the protruding wedges. The steps of forming the shape of the spade bit portion from the larger smashed spade portion may include the step of cutting and stamping the shape at an angle to facilitate formation of one or more bevelled edge surfaces. Threads may also be added to the center tip, if desired.

These and other advantages and features of novelty which characterize the invention are pointed out with particularity in the claims annexed hereto, and forming a part hereof. However, for a better understanding of the invention, its advantages and objects obtained by its use, reference should be had to the drawings which form a further part hereof and to the accompanying descriptive matter in which there is illustrated and described preferred embodiments of the invention.

BRIEF DESCRIPTION OF THE DRAWINGS

In the drawings, reference numerals generally indicate corresponding parts throughout the several views.

DETAILED DESCRIPTION OF THE PREFERRED EMBODIMENTS

Figure 1:
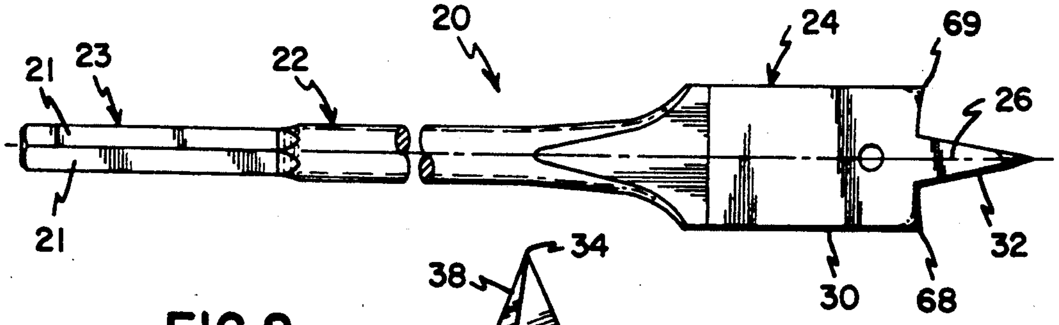
FIG. 1 is a front view of a first preferred embodiment of a spade-type drill bit according to the present invention.

Referring now to FIGS. 1-8, a first preferred embodiment of a spade-type drill bit, or spade bit 20, is shown according to principles of the present invention. As shown in FIG. 1, spade bit 20 includes an elongated shank portion 22 with end 23 having a plurality of flat surfaces 21. End 23 is received by a drill (not shown) to be cooperatively grasped by the chuck of the drill during the drilling operation. Spade bit 20 of the present invention is usable in a variety of different drills including electric hand drills, drill presses, cordless drills, and other drills including manual hand drills.

Referring to FIG. 1, spade bit 20 includes a spade bit portion 24 extending from the shank portion 22 at the end opposite to end 23. FIGS. 2-8 show the spade bit portion 24 in greater detail. Spade bit portion 24 comprises a spade portion 30. Spade portion 30 has a planar central region or area comprising a significant part of spade portion 30. Perpendicular line 28 is perpendicular to longitudinal axis 26 and to the planar region of spade portion 30.

Figure 2:
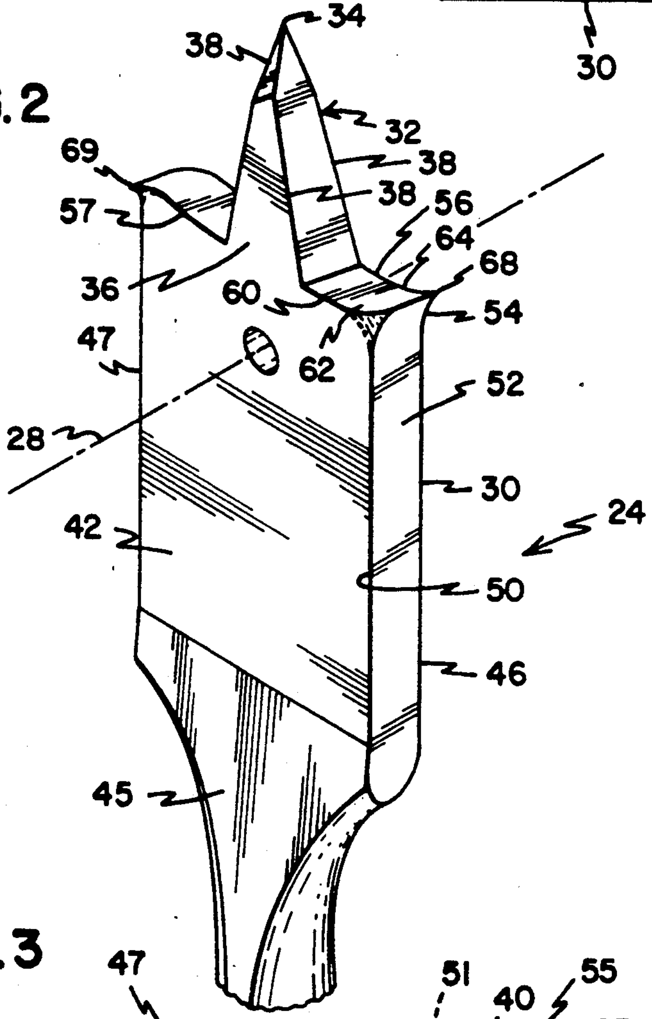
FIG. 2 is an enlarged perspective view of the spade bit portion of the spade-type drill bit shown in FIG. 1.
Figure 3:
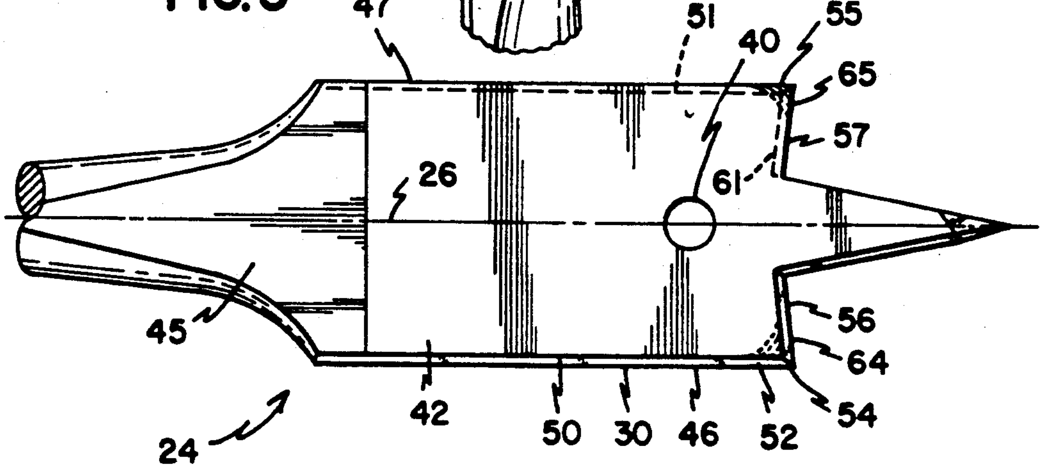
FIG. 3 is a front view of the spade bit portion shown in FIG. 2.
Figure 4:
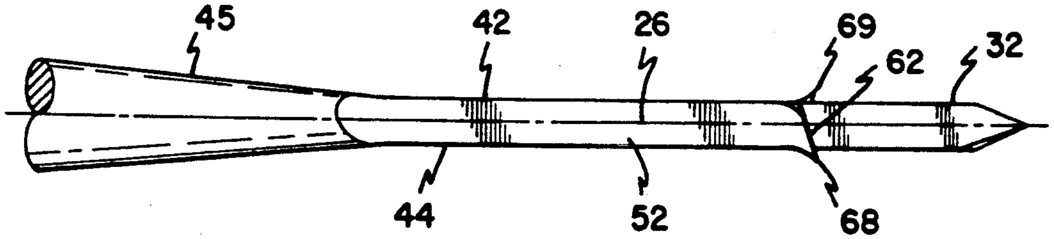
FIG. 4 is a side view of the spade bit portion shown in FIG. 2.

A centering spike, or center tip 32, extends from spade portion 30. As best shown in FIG. 2, center tip 32 extends from spade portion 30 from tip attachment region 36 and terminates in tip portion 34. A plurality of cutting edges 38 are provided on center tip 32 to facilitate penetration through the wood or other material during the drilling operation.

Figure 5:
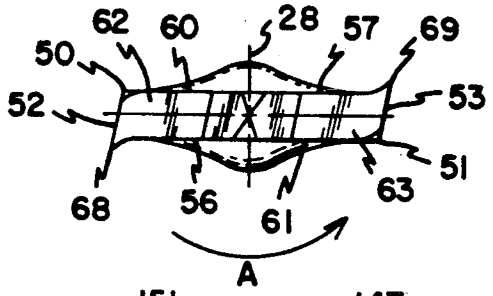
FIG. 5 is an end view of the spade bit portion shown in FIG. 2.

During drilling, spade bit 20 is rotated about longitudinal axis 26 in a counterclockwise direction if viewed from the spade bit portion end of the spade bit, as is the case in FIG. 5. Arrow A of FIG. 5 represents the direction of rotation of spade bit 20.

Spade portion 30 is preferably substantially planar with front major surface, or front surface 42, and back major surface, or back surface 44, being substantially parallel to each other. The surfaces also extend substantially parallel to longitudinal axis 26. Tapered region 45 is the transition region between shank portion 22 and spade portion 30.

Side cutting edges, or longitudinal cutting edges 46, 47, form longitudinal side edges of spade portion 30. During rotation of the spade bit 20 about the longitudinal axis 26 during the drilling operation, longitudinal cutting edges 46, 47 are the leading side edges. These cutting edges engage the sides of the hole as it is cut through the wood or other material. These cutting edges also help to smooth out the side surfaces of the hole into and/or through the material.

Longitudinal side surfaces 52, 53 extend from the longitudinal cutting edges 46, 47 toward back edges 50, 51. As shown in FIGS. 2-6, longitudinal cutting edge 46 is formed by the intersection of back surface 44 and longitudinal side surface 52. Similarly, longitudinal cutting edge 47 is formed by the intersection of front surface 42 and longitudinal side surface 53.

As best shown in FIG. 5, longitudinal side surfaces 52, 53 are generally parallel to each other and extend generally parallel to the longitudinal axis 26. In the preferred embodiment, longitudinal side surfaces 52, 53 each define planes which are not perpendicular to the planes defined generally by the front and back surfaces 42, 44. Side surfaces 52, 53 are bevelled surfaces relative to line 28. Back edges 50, 51 do not extend radially as far from axis 26 as do longitudinal cutting edges 46, 47 to facilitate proper operation. By configuring the vertical side surfaces 52, 53 in this manner, as bevelled surfaces, the back edges 50, 51 do not interfere with, nor are they involved in, the cutting operation. The vertical side surfaces are at any angle greater than zero to line 28 such that they are disposed away from the cutting activity by longitudinal edges 46, 47. An angle of approximately 5 degrees is satisfactory.

Referring again to FIGS. 2-6, two radial cutting edges 56, 57 extend generally radially outward from adjacent the center tip 32 in opposite directions from the longitudinal axis 26. The radial cutting edges 56, 57 form bottom edges of the spade portion 30. During the drilling operation, radial cutting edges 56, 57 are the leading edges that contact and cut through the wood or other material at the bottom surface of the hole. These edges are the primary cutting edges used during the drilling operation.

Figure 6:
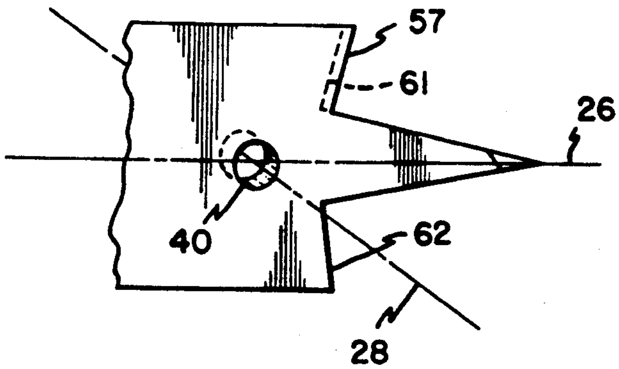
FIG. 6 is another perspective view of the spade bit portion shown in FIG. 2 showing the planar structure of one of the bottom surfaces and one of the radial cutting edges.

Bottom surfaces 62, 63 extend back from the radial cutting edges 56, 57 to back edges 60, 61. Preferably, bottom surfaces 62, 63 each define planar surfaces with the radial cutting edges 56, 57 respectively being in the same plane. FIG. 6 best illustrates the planar structure of one of the bottom surfaces, bottom surface 62. Spade bit 20 in FIG. 6 is positioned with axis 26 rotated and tilted relative to the view shown in FIG. 3 to clearly show the planar structures of bottom surface 62 in the same plane as cutting edge 56 and back edge 60. Bottom surface 63 has a similar structure.

Figure 8:
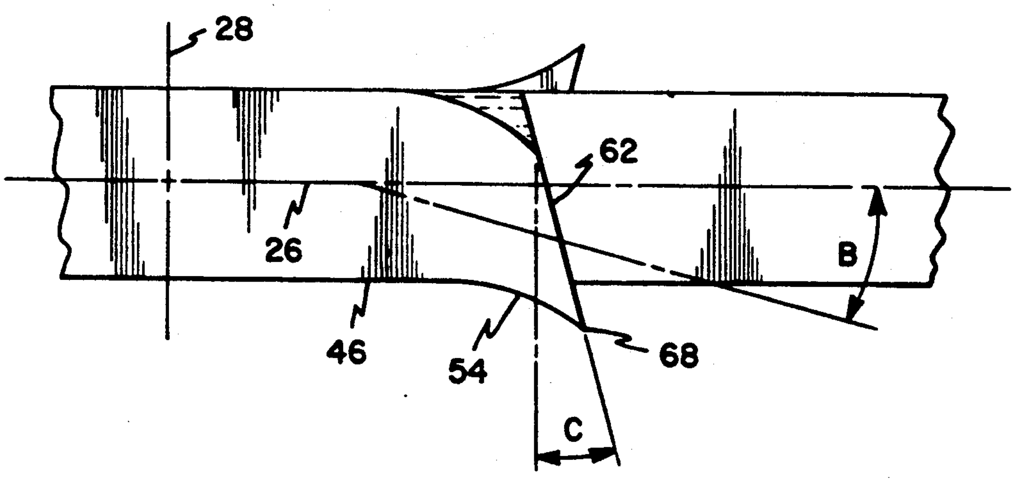
FIG. 8 is a close up side view of a portion of the spade bit portion shown in FIG. 4.

Preferably, bottom surfaces 62, 63 also extend in a angled direction toward the end of center tip 30 as the surfaces extend in a direction from the back edges 60, 61 to the radial cutting edges 56, 57. As shown in FIG. 8, the bottom surfaces 62, 63 are at an angle C to perpendicular line 28. Preferably, angle C is between approximately 10 and 20 degrees; more preferably, at approximately 15 degrees to line 28.

The configuration of the radial cutting edges 56, 57 and bottom surfaces 62, 63 provide several advantages. One advantage is that the bevelled bottom surfaces with leading radial cutting edges 56, 57 facilitate cutting into the wood or other material since those edges are the leading edges and the back edges 60, 61 are disposed away from the direction of travel of the spade bit 20 during the drilling operation.

Another advantage provided by the planar structure of the bottom surfaces 62, 63 is that should the radial cutting edges 56, 57 become dull after a period of time due to wear, the radial cutting edges 56, 57 can be easily sharpened with a flat file. The filing operation can easily proceed with smooth filing motions with a conventional flat file since the bottom surfaces and cutting edges are planar.

As best shown in FIG. 2, the spade bit portion includes two corner tips 68, 69 on opposite corners of the spade portion 30 and disposed generally radially from the longitudinal axis 26 in opposite directions from the axis. Corner tip 68 is formed by the intersection of radial cutting edge 56 and longitudinal cutting edge 46. The other corner tip 69 is formed by the intersection of radial cutting edge 57 and longitudinal cutting edge 47.

As best illustrated by FIG. 5, each of the corner tips 68, 69 is displaced or positioned forward of the plane defined by the planar section of the spade portion 30 in the direction of rotation of the spade bit 20. As will be discussed below, the displaced corner tips 68, 69 form protruding wedges which facilitate efficient and smooth drilling. The corner tips are preferably bent or otherwise positioned out of the plane of the spade portion 30 to their positions illustrated in the Figures. The present invention identifies performance advantages by providing protruding wedges of various shapes regardless of the method of manufacture.

Figure 7:
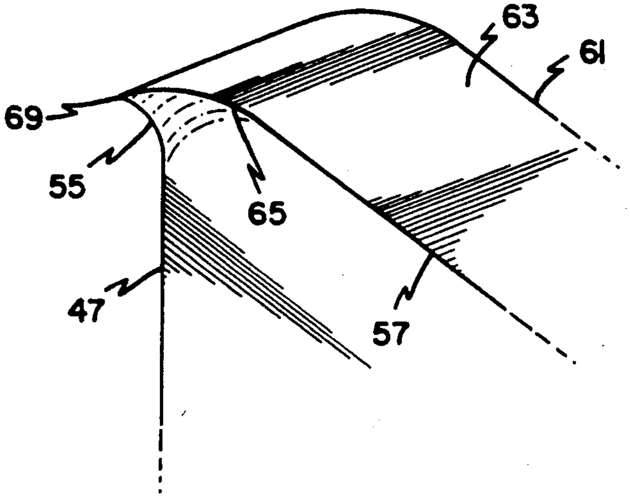
FIG. 7 is a close up perspective view of the spade bit portion shown in FIG. 2, showing one of the corner tips in greater detail.

FIGS. 7 and 8 illustrate in greater detail the structure of the corner tips and cutting edges of the protruding wedges. Each of the longitudinal cutting edges 46, 47 and each of the radial cutting edges 56, 57 are provided with nonlinear cutting edge portions along each cutting edge adjacent each of the corner tip 68, 69. Smoother curves along the cutting edges are preferred over sharper bends. As shown in the Figures, corner tip 68 includes curved portion 64 and 54. Corner tip 69 includes curved portion 65 and 55. The curved portions form curved wedges protruding from the planar portion of the spade portion 30. FIG. 7 illustrates in greater detail the curved structures of corner tip 69. FIG. 8 illustrates in greater detail in a different view a portion the curved structures of corner tip 68.

The radial cutting edges 56, 57 and the longitudinal cutting edges 46, 47 of the preferred embodiment are continuous cutting edges, with smooth curves preferably, terminating at the corner tips. By placing the corner tips 68, 69 forward of the plane of the spade portion 30, and providing curved cutting edges, a faster and easier drilling operation may result compared to when a completely planar spade bit is used. With respect to the longitudinal cutting edges 46, 47, a significant portion is linear. The linear portion has a smooth transition to the curved portions 54, 55 which terminate in each of the corner tips 68, 69. With respect to the radial cutting edges 56, 57, a linear portion exists adjacent the tip attachment region 36 where the radial cutting edges 56, 57 intersect the center tip 32. The linear portion also has a smooth transition to the curved portions 64, 65 which terminate at each corner tip 68, 69.

The specific shape of the curved portions 54, 55, 64, 65 may vary. If the corner tips 68, 69 are formed by bending the tips out of the plane of the spade portion 30 during manufacturing, the geometry may be influenced by how the tips are bent. The bending may be accomplished with a hammer or other suitable forging tool for small quantities, or by a stamping die made for the purpose to produce large quantities. If the tips are bent around a fairly sharp edge structure, for example, the curved portions may include a fairly sharp bend area or curves of small radii. If the corner tips are bent around a more cylindrical or other curved structure, the curved cutting edge portions will define generally smoother curves. If a fairly sharp linear edge structure or a cylindrical rod structure is used to form the tips manually for example, the edge or rod may be placed at an angle to the longitudinal axis 26 in contact with the front or back surface and then the tips bent by the application of a moving tool in a single step.

Other structures may be used to bend the tips from the plane of the spade portion 30. In addition, other processes are anticipated for providing a planar spade portion with wedges at the lower corners which protrude outward from the plane.

Performance characteristics of the spade bit 20 may be affected by the forward extension of each of the corner tips 68, 69 relative to the plane defined by the planar portion of the spade portion 30. In other words, when the corner tips 68, 69 are displaced from the plane of the spade portion 30 at different relative positions for different spade bits, the speed and ease of cutting may be affected. In the case of a $\frac{3}{4}$ inch spade bit (for drilling holes of $\frac{3}{4}$ inch diameters), it has been found that if each corner tip 68, 69 is displaced from the plane at an angle of approximately 10 degrees from the plane of the spade portion 30, the spade bit 20 performs well with a conventional portable electric drill for many common woods. Angle B in FIG. 8 represents generally the positioning of the corner tips out of the plane of spade portion 30 at the angle B. It is to be appreciated that angle B is a general representation of the displaced tips. Since the preferred structure includes bent tips with smoother curves, angle B is an approximation of the general structure of the corner tips.

By varying the displacement of the corner tips 68, 69, and the curvature of the curves on the cutting edges, spade bit 20 performance may be altered. In the case of cordless drills, less power and torque is typically available to turn the spade bit 20. In that case, relative displacements of the corner tips 68, 69 from the plane defined by the spade portion 30 may not be as great as in the case of conventional electric drills. The characteristics of the wood or other material may also affect drill bit performance. Harder woods, for example, may require less displacement of the tips for optimum performance. Angle B may be varied anywhere from a few degrees to 25 degrees or more. Those skilled in the art can vary the displacement of the tips and the curvatures to vary performance as necessary for varying conditions.

In the embodiment shown in FIGS. 1-8, the corner tips 68, 69 are located axially closer to the end of tip portion 34 of the center tip 32 than respective intersection points of the radial cutting edges 56, 57 and the center tip 32. In other words, the radial cutting edges 56, 57 preferably extend partially downward in a direction toward the corner tips 68, 69 when the spade bit is oriented vertically with the center tip 32 pointing downward. This cuts a convex shaped hole bottom during the drilling operation.

The location and configuration of the corner tips described above provides certain performance advantages. The tip of each corner tip will pass into the plane of a piece of wood slightly before the cutting edges 56, 57. This allows for cleaner exit holes. The corner tips also cut through the wood fibers with a wedging action because the radial cutting edge on each of the corner tips does not define a perfect radius turning on the axis of rotation, but defines a cutting edge with a portion at the corner tip ahead of a true radius. This wedging action provides a smoother cut with less effort and torque.

In the preferred embodiment, spade bit 20 is of one piece construction with the shank portion 22 and the spade bit portion 24 integrally formed. The spade bit 20 may be made from a variety of materials, preferably high carbon steel.

Figure 9:
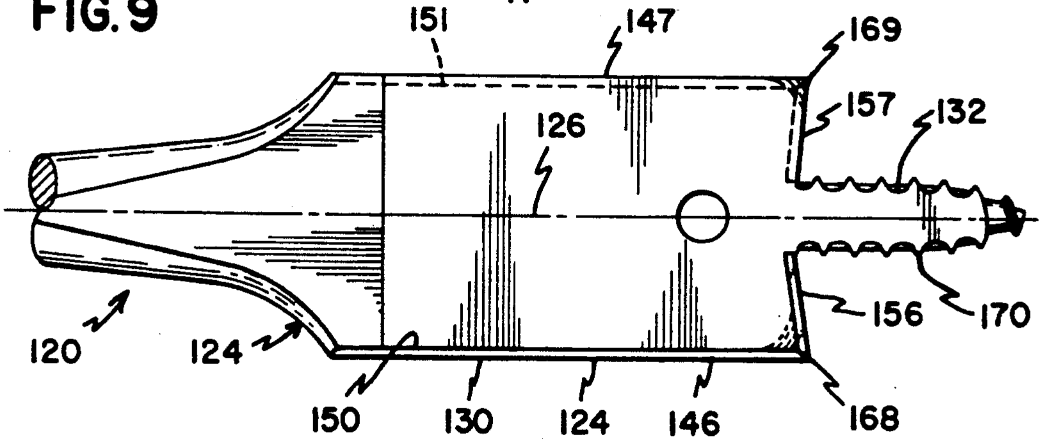
FIG. 9 is a second preferred embodiment of a spade-type drill bit with threads showing only the spade bit portion.
Figure 10:
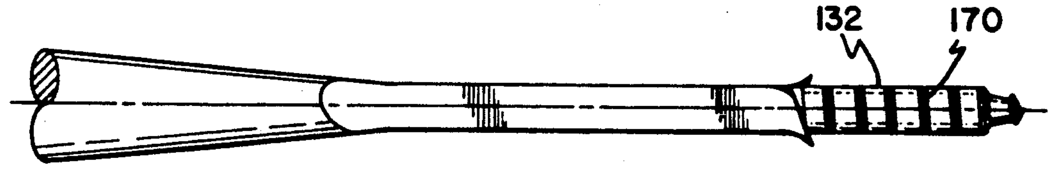
FIG. 10 is a side view of the second preferred embodiment of the spade-type drill bit shown in FIG. 9.

Referring now to FIGS. 9 and 10, a second preferred embodiment of a spade bit 120 is shown. In FIGS. 9 and 10, only the spade bit portion 124 of spade bit 120 is shown. During operation, spade bit 120 is rotated about longitudinal axis 126. Like spade bit 20, spade bit 120 includes a substantially planar spade portion 130 with a center tip 132 extending from the spade portion 130. Radial cutting edges 156, 157 extend generally radially outward from the center tip and terminate in corner tips 168, 169. Longitudinal cutting edges 146, 147 form side edges of the spade portion 130.

Spade bit 120 is different from spade bit 20 in that center tip 132 includes threads 170 on at least a portion of the center tip 132. The threads 170 provide mechanical assistance for drawing spade bit 120 into the wood or other material during the drilling operation. As the threads 170 draw the spade bit 120 through the wood, radial cutting edges 156, 157 and longitudinal cutting edges 146, 147 are rotated into and through the material to be cut to form the hole in the material.

Threads 170 can be provided with a variety of thread dimensions. As the thread size varies, the ability of the threads 170 to draw the spade bit 120 into and through the material will vary. As the thread size increases (decrease in the number of threads per inch), the threads 170 will draw the spade bit 120 through the material more aggressively. In that case, greater power and torque is generally required to drill the hole. As the thread size is made smaller, the threads 170 will less aggressively draw spade bit 120 through the material. Appropriate thread sizing can be provided depending on the desired usage of the spade bit 120 with a particular type of drill in drilling into particular materials.

Figure 11:
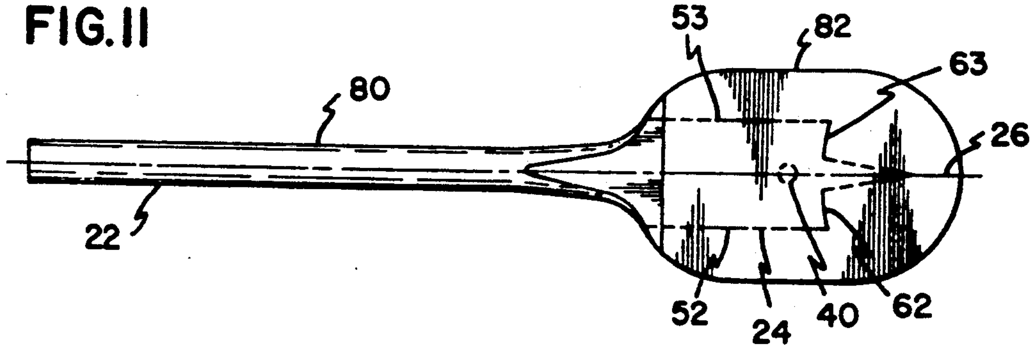
FIG. 11 is an example of round stock used to manufacture the spade-type drill bit shown in FIGS. 1-10, the round stock having one end smashed to form the spade bit portion of the spade bit, with the outline of the desired spade bit portion shown in dashed lines.
Figure 12:
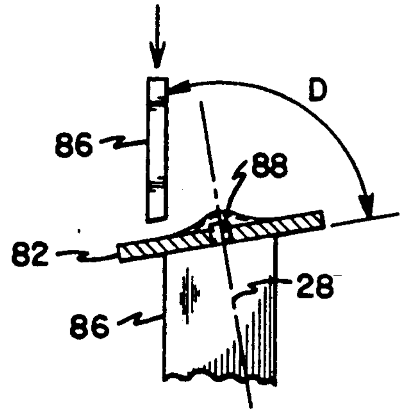
FIG. 12 is a schematic representation of the die mechanism used to cut one of the side surfaces of the spade bit portion from the smashed end of the round stock shown in FIG. 11, the spade bit shown in cross-section.
Figure 13:
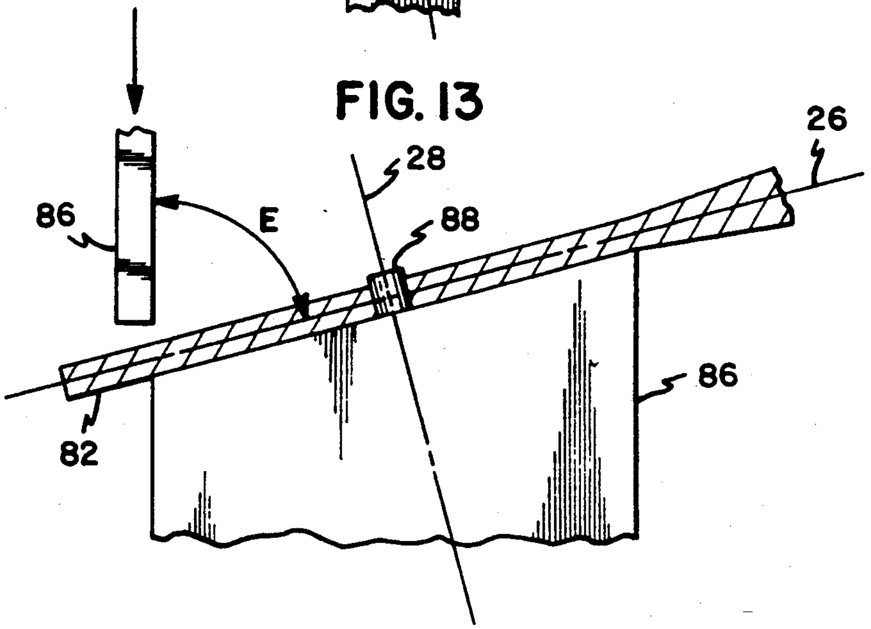
FIG. 13 is an enlarged schematic representation of the die mechanism used to cut one of the bottom surfaces of spade bit portion from the smashed end of the round stock shown in FIG. 11, the spade bit shown in cross-section.

The present invention also relates to methods for manufacturing the spade bit of the type shown in FIGS. 1-10 in which the spade bit has displaced or bent lower corner tips and non-linear, preferably curved, cutting edges extending from each of the corner tips. FIGS. 11-13 help illustrate the steps in the preferred method of manufacturing a spade-type drill bit like spade bit 20 with displaced corners and curved cutting edges extending from each of the displaced corners.

Referring now to FIG. 11, a piece of elongated round metal stock 80 is shown which may be used to form the spade bit 20. One end of the round metal stock 80 is smashed to include a generally planar portion 82 as shown in FIG. 11. FIG. 11 also illustrates in dashed lines the outline of the spade bit portion 24 that is to be cut from the generally planar portion 82 concentric with longitudinal axis 26. The opposite end of the round metal stock from the end having the smashed planar portion 82 forms the shank portion 22 of the spade bit 20. It is to be appreciated that a longer piece of metal stock could be smashed in the middle instead. By forming the smashed portion into two spade bit portions, each lying end to end, two spade bits may be formed in a more efficient manufacturing process.

Once the round stock has been smashed at one end, the spade bit portion 24 is then cut or formed. Preferably, dies are used to stamp and cut the waste material from the spade bit portion 24. Simultaneously with that cutting operation, or, alternatively, after the cutting operation, the corner tips of the spade bit are bent outward from the plane formed by the planar portion 82. The various cutting edges of the spade bit may then be sharpened. Other processing steps may also be performed, such as providing a wax coating or treating the bit in a surfacing tumbler.

FIG. 12 illustrates a technique for forming the bevelled side surfaces along the longitudinal sides of the planar portion. As noted above, these side surfaces are not transverse to the plane defined by the planar portion. By angling the planar portion at an angle D, the surfaces formed by dies 86 will also be at an angle to the planar portion of less than 90 degrees. This technique is useful for forming the longitudinal side edges 52, 53 during the stamping operation.

FIG. 13 illustrates a technique for forming the bevelled bottom surfaces along the bottom edges of the planar portion. These surfaces are not transverse to the plane defined by the planar portion. By angling the planar portion at an angle E, the surfaces formed by the dies 86 will also be at an angle to the planar portion of less than 90 degrees. This technique is useful for forming the bottom surfaces 62, 63 during the stamping operation.

By simultaneously angling the longitudinal axis relative to the motion of the die at an angle of less than 90 degrees (see angles D and E of FIGS. 12 and 13), and providing an appropriately shaped die, at least one of the side surfaces 52, 53 and the respective adjacent bottom surfaces 62, 63 may be formed simultaneously at bevelled angles to the planar portion. By forming some or all of these angles at the stamping stage, less grinding and sharpening is necessary of the spade bit to put it in the desired finished form.

In the preferred method, the spade bit is formed by cutting each half of the spade bit portion 24 in a separate operation. In other words, with respect to the spade bit 20 shown in FIGS. 1-8, vertical side surface 52, bottom surface 62 and half of the center tip 32 is formed in a first cutting operation. In a second cutting operation, vertical side surface 53 and bottom surface 63, as well as the other half of the center tip 32 is formed. Also, in the preferred method, the bending operation takes place simultaneous with the stamping and cutting operation.

If threads are desired on center tip 32, then they may applied after the spade bit portion 24 has been cut from the smashed end of the round stock 80.

Hole 40 as shown in FIGS. 1-3, 6, 9, and 11 is provided for several purposes. One purpose is that it provides a handy mechanism for hanging the spade bit 20 on a nail or other elongated rod for storage purposes. A second purpose is that hole 40 serves as an alignment mechanism during manufacturing of the spade bit 20. As shown in FIGS. 12 and 13, a cooperating alignment peg 88 can be placed on the stamping tool to center the flattened stock for trimming. This use of hole 40 is of added benefit if the trimming and shaping of the bit is done in several steps. The hole placed on the peg during each step assures the bit will be symmetrical. By proper die design, one side surface and one bottom surface can be formed in one action, the bit then turned 180 degrees about axis 26 and the opposite side and bottom surfaces can be formed in a second action. With this method, very little grinding of the surfaces is required even though the surfaces are not perpendicular to the planar sides of the spade bit.

It is to be understood, that even though numerous characteristics and advantages of the invention have been set forth in the foregoing description, together with details of the structure and function of the invention, the disclosure is illustrative only, and changes may be made in detail, especially in matters in shape, size, and arrangement of the parts within the principles of invention to the full extent indicated by the broad general meaning of the terms in which the appended claims are expressed.

What is claimed is:

1. A spade-type drill bit comprising:

a shank portion defining a longitudinal axis about which the drill bit is rotated during drilling; and a spade bit portion extending from the shank portion, the spade bit portion including:

a spade portion including first and second radial cutting edges, first and second longitudinal cutting edges, first and second corner tips, and a central planar portion; and a center tip concentric with the longitudinal axis and extending from the spade portion;

the first and second radial cutting edges extending from the center tip outward away from the longitudinal axis in opposite directions, the first and second radial cutting edges both intersecting the center tip at an intersection point;

the first and second longitudinal cutting edges extending generally in the direction of the longitudinal axis;

the first and second corner tips radially disposed from the longitudinal axis on opposite sides of the spade portion, the first corner tip formed by the intersection of the first radial cutting edge and the first longitudinal cutting edge, the second corner tip formed by the intersection of the second radial cutting edge and the second longitudinal cutting edge;

the first and second corner tips each defining the outermost portions of the spade bit portion relative to the longitudinal axis;

the first and second corner tips each located forward of the central planar portion of the spade portion in the direction of rotation of the drill bit;

the first and second corner tips each located forward of the respective radial cutting edges relative to the central planar portion of the spade portion in the direction of rotation of the drill bit;

the first and second radial cutting edges each including a nonlinear portion disposed between the respective first and second corner tips and the respective intersection points of the first and second radial cutting edges and the center tip.

2. The spade-type drill bit of claim 1, wherein the first and second corner tips extend axially forward along the longitudinal axis in the direction of cutting from respective intersection points of the first and second radial cutting edges and the center tip.

3. The spade-type drill bit of claim 1, wherein the spade-type drill bit is integrally formed from a single piece of metal.

4. The spade-type drill bit of claim 1, further comprising threads on the center tip concentric with the longitudinal axis.

5. The spade-type drill bit of claim 1, wherein each radial cutting edge lies in a single plane.

6. The spade-type drill bit of claim 1, wherein each longitudinal cutting edge lies in a single plane.

7. The spade-type drill bit of claim 6, wherein the spade portion includes front and back major surfaces and two opposing side surfaces extending along a respective side of the spade portion, each longitudinal cutting edge being defined by the intersection of one of the front or back major surfaces of the spade portion and a side surface, and wherein each of the side surfaces is a bevelled surface not perpendicular to the planar portion.

8. A spade-type drill bit comprising:

a shank portion defining a longitudinal axis about which the drill bit is rotated during drilling; and a spade bit portion extending from the shank portion, the spade bit portion including:

a spade portion with a planar portion; and a center tip concentric with the longitudinal axis and extending from the spade portion;

the spade portion including a first major surface and a second major surface;

the spade portion including a first edge portion and a second edge portion each extending from the center tip outward away from the longitudinal axis in opposite directions and parallel to the planar portion of the spade portion;

the spade portion further including a third edge portion and fourth edge portion each extending parallel to the planar portion of the spade portion and generally in a direction toward the shank portion;

the spade-portion further including first and second protruding wedges on opposite sides of the spade portion, the first and second protruding wedges both at a forward location in the direction of rotation of the bit relative to the planar portion of the spade portion, the first protruding wedge including an edge portion which connects the first edge portion to the third edge portion to form a continuous edge of the first major surface, the second protruding wedge including an edge portion which connects the second edge portion to the fourth edge portion to form a continuous edge of the second major surface.

* * * * *